US008256951B2

(12) United States Patent
Adelsberg et al.

(10) Patent No.: US 8,256,951 B2
(45) Date of Patent: Sep. 4, 2012

(54) STIRRERS FOR MINIMIZING EROSION OF REFRACTORY METAL VESSELS IN A GLASS MAKING SYSTEM (75) Inventors: Lee Martin Adelsberg, Elmira, NY (US); Martin Herbert Goller, Beaver Dams, NY (US); David Myron Lineman, Painted Post, NY (US); James Patrick Murphy, Corning, NY (US)

(73) Assignee: Corning Incorporated, Corning, NY (US)

(*) Notice: Subject to any disclaimer, the term of this patent is extended or adjusted under 35 U.S.C. 154(b) by 1242 days.

(21) Appl. No.: 11/643,059

(22) Filed: Dec. 21, 2006

(65) Prior Publication Data

US 2008/0151687 A1    Jun. 26, 2008

(51) Int. Cl.
*C03B 5/18* (2006.01)

(52) U.S. Cl. ............... 366/328.1; 366/328.2; 366/325.1; 65/178

(58) Field of Classification Search ............ 65/178–180; 366/325.1, 328.1, 328.2, 279, 342–343, 262–265, 366/270
See application file for complete search history.

(56) References Cited

U.S. PATENT DOCUMENTS

| X5080 | I1 | * | 4/1828 | Spain ........................ 366/328.2 |
| 43,999 | A | * | 8/1864 | Killin ........................ 366/164.5 |
| 64,471 | A | * | 5/1867 | Ballard, Sr. ............. 366/325.93 |
| 948,004 | A | * | 2/1910 | Brown ...................... 366/328.2 |
| 1,328,799 | A | * | 1/1920 | Peiler .......................... 416/96 R |
| 1,631,061 | A | * | 5/1927 | Rankin ......................... 65/331 |
| 1,678,291 | A | * | 7/1928 | Howard ........................ 65/180 |
| 1,828,442 | A | * | 10/1931 | Rankin ......................... 65/325 |
| 2,055,676 | A | * | 9/1936 | Stewart ........................ 65/131 |
| 2,093,374 | A | * | 9/1937 | Wadsworth .................. 65/131 |
| 2,100,760 | A | * | 11/1937 | Wadsworth .................. 65/122 |
| 2,310,290 | A | * | 2/1943 | Honiss ......................... 65/129 |
| 2,515,478 | A | * | 7/1950 | Tooley et al. ............... 65/180 |
| 2,569,459 | A | * | 10/1951 | De Voe ...................... 65/135.4 |

(Continued)

FOREIGN PATENT DOCUMENTS

CN          1167475 A     12/1997

(Continued)

OTHER PUBLICATIONS

New Stirrer Technology for the Glass Industry by Ducanan R. Coupland and Paul Williams, Platinum Metals Rev., 2005, 49 (2), 62-69.

(Continued)

*Primary Examiner* — Charles E Cooley
(74) *Attorney, Agent, or Firm* — Kevin M. Able (57) ABSTRACT

Stirring apparatuses for stirring molten glass are disclosed. The method includes stirring a molten glass with a stirrer comprising a layer containing at least about 50% iridium. An apparatus comprising an iridium-containing layer is also presented. In one embodiment, an apparatus for stirring molten glass includes a cylinder comprising a bore. A stirrer may be disposed in the bore. The stirrer may include a platinum or platinum alloy shaft coaxial with the cylinder. A plurality of impellers may project radially from the shaft into close proximity of a wall of the cylinder. Each impeller may include an arcuate distal end portion farthest from the shaft. The distal end portion of each impeller consists of iridium or an iridium alloy and the remainder of the impeller consists of platinum or a platinum alloy. The stirring apparatuses reduce metal loss from the refractory metal of the stirring apparatus.

7 Claims, 5 Drawing Sheets

U.S. PATENT DOCUMENTS

| | | | | |
|---|---|---|---|---|
| 2,570,078 A * | 10/1951 | Spremulli | | 65/180 |
| 2,716,023 A * | 8/1955 | Cleveland | | 65/180 |
| 2,750,161 A * | 6/1956 | Simmons | | 65/135.3 |
| 2,762,167 A | 9/1956 | DeVoe et al. | | 49/77 |
| 2,831,664 A * | 4/1958 | Spremulli | | 366/329.1 |
| 2,871,000 A * | 1/1959 | Dowling | | 366/289 |
| 2,891,777 A * | 6/1959 | Gregorius | | 366/290 |
| 2,955,924 A * | 10/1960 | Smith | | 422/208 |
| 2,984,864 A * | 5/1961 | Levecque et al. | | 65/460 |
| 3,015,127 A * | 1/1962 | Stalego | | 65/441 |
| 3,233,993 A * | 2/1966 | Weidel | | 65/374.11 |
| 3,352,659 A * | 11/1967 | Rahe | | 65/178 |
| 3,359,090 A * | 12/1967 | Hynd | | 65/178 |
| 3,420,649 A * | 1/1969 | Lewis, Jr. | | 65/66 |
| 3,488,172 A * | 1/1970 | Aliotta et al. | | 65/493 |
| 3,657,784 A | 4/1972 | Selman et al. | | 29/195 |
| 3,725,025 A * | 4/1973 | Gimenez | | 65/135.3 |
| 4,036,601 A | 7/1977 | Weimar et al. | | 428/663 |
| 4,278,460 A * | 7/1981 | Chrisman et al. | | 65/135.1 |
| 4,983,198 A | 1/1991 | Ogino | | 65/32.5 |
| 5,573,564 A * | 11/1996 | Richards | | 65/29.13 |
| 6,763,684 B2 * | 7/2004 | Pitbladdo | | 65/135.4 |
| 7,127,919 B2 * | 10/2006 | Goller et al. | | 65/135.3 |
| 7,475,568 B2 * | 1/2009 | Bookbinder et al. | | 65/134.9 |
| 7,735,340 B2 * | 6/2010 | Burdette et al. | | 65/135.2 |
| 2002/0023464 A1 * | 2/2002 | Pitbladdo | | 65/126 |
| 2002/0178753 A1 * | 12/2002 | Dick et al. | | 65/86 |
| 2003/0101750 A1 * | 6/2003 | Goller et al. | | 65/135.3 |
| 2004/0067369 A1 * | 4/2004 | Ott et al. | | 428/432 |
| 2006/0242995 A1 * | 11/2006 | Bookbinder et al. | | 65/134.1 |
| 2006/0242996 A1 * | 11/2006 | DeAngelis et al. | | 65/134.1 |
| 2008/0011016 A1 * | 1/2008 | Bergman et al. | | 65/29.12 |
| 2008/0057275 A1 * | 3/2008 | Grzesik et al. | | 428/195.1 |
| 2008/0151687 A1 * | 6/2008 | Adelsberg et al. | | 366/279 |
| 2009/0056382 A1 * | 3/2009 | Ott et al. | | 65/374.12 |
| 2009/0126405 A1 * | 5/2009 | DeAngelis et al. | | 65/32.5 |
| 2009/0165500 A1 * | 7/2009 | Luebbers et al. | | 65/32.5 |
| 2011/0032791 A1 * | 2/2011 | Singer | | 366/307 |

FOREIGN PATENT DOCUMENTS

| | | | |
|---|---|---|---|
| DE | 19644673 | | 4/1998 |
| GB | 1222248 | * | 2/1971 |
| JP | 10-59726 | * | 3/1998 |
| JP | 2004099339 | | 5/2002 |
| TW | I233431 | | 6/2005 |
| WO | 96/15071 | | 5/1996 |
| WO | WO 03/048054 A1 | * | 6/2003 |
| WO | 2006/115972 | | 11/2006 |

OTHER PUBLICATIONS

High Temperature Mechanical Properties of the Platinum Group Metals by R. Weiland and D. F. Lupton Platinum Metals Rev., 2006 50 (4), 158-170.

PCT/US07/23435 International Search Report and Written Opinion dated May 7, 2008.

Chinese Application No. 200780047692.3 Notice on the First Office Action dated Apr. 19, 2011.

Chinese Application No. 200780047692.3 Notice on the Second Office Action dated Mar. 19, 2012.

Search Report for Taiwan Invention Patent Application No. 096148855 dated Oct. 31, 2011.

* cited by examiner

STIRRERS FOR MINIMIZING EROSION OF REFRACTORY METAL VESSELS IN A GLASS MAKING SYSTEM

BACKGROUND OF THE INVENTION

1. Field of the Invention

The present invention is directed to an apparatus for stirring glass, and in particular to an apparatus for stirring glass in transit from a main supply body to a working body or to a forming apparatus.

2. Technical Background

Formed glass is often considered to be a relatively inert material. Indeed, for this reason glass vessels often serve as containers in a vast array of different industries. However, during the glass manufacturing process molten glass is conveyed at very high temperature (in excess of 1600° C. in some cases). At such high temperatures molten glass itself can be quite corrosive, thus requiring a corrosion-resistant system of piping and containment. This corrosion can lead to failure of the vessel material. Consequently, most containment and transfer systems for molten glass rely upon vessels constructed from refractory metals. One such vessel is the stirring chamber.

In a typical glass manufacturing process, glass precursors, or batch materials, are combined and melted in a furnace to form molten glass (the "melt"). The glass stream flowing from the batch-melting tank or other vessel may vary in refractive index both longitudinally and transversely at any given time. Longitudinal variations generally result from changes in the batch and in the melting conditions; transverse variations generally result from volatilization of molten glass constituents and from corrosion or erosion of the melting-container refractories and present themselves in the form of cords or striae.

The presence of such variations is of no particular significance in the production of many types of glassware. When glass designed for ophthalmic or other optical purposes is being melted, however, the presence of such variations assumes primary importance since the quality and, hence, the saleability of the resulting ware are controlled thereby; and the reduction or substantial elimination of such variations becomes not only desirable but essential if satisfactory ware, i.e., ware in which the degree of homogeneity or variation of refractive index within an individual piece is maintained within a desired degree of tolerance, is to be produced.

By careful control of the batch composition together with maintaining substantially constant melting conditions, longitudinal variation of the refractive index can be held within a relatively narrow tolerance.

Through use of a homogenizing or stirring process cords or striae present in the glass can be substantially eliminated.

During the stirring process, the stirring apparatus stirs the molten glass and breaks the cord into increasingly finer divisions until what cord has not been homogenized into the melt is of inconsequential size.

As with the other molten glass conveying portions of the glass making process, the stirring apparatus, and in particular the rotating stirrer, is typically constructed from a refractory metal capable of withstanding the high temperature, corrosive environment of the molten glass. The refractory metal generally chosen for this application is typically platinum, or a platinum rhodium alloy.

In spite of its advantages, however, platinum, or alloys thereof, is not erosion proof, and the high stress developed within the stirring apparatus during the stirring of the viscous molten glass may lead to erosion of the metal surface and subsequent contamination of the molten glass with refractory metal particulate.

What is needed is a method of reducing erosion of the refractory metal surfaces of the stirring apparatus, and in particular, the rotating stirrer.

SUMMARY

It is an object of the present invention to provide an apparatus for reducing the occurrence of refractory metal particulate in molten glass.

In one embodiment according to the present invention, a method of stirring molten glass is disclosed comprising flowing molten glass through a stirring vessel, the stirring vessel comprising a stirrer disposed therein rotating the stirrer to stir the molten glass and wherein the stirrer comprises an outer layer comprising at least about 50% by weight iridium.

In another embodiment, an apparatus for stirring molten glass is presented comprising a cylinder comprising a bore, a shaft coaxial with the cylinder disposed within the bore, an impeller projecting radially from the shaft into close proximity of a wall of the cylinder and wherein the impeller comprises an outer layer in contact with the molten glass comprising at least about 50% by weight iridium.

In still another embodiment, a stirrer for stirring molten glass is disclosed comprising a shaft, an impeller extending radially from the shaft; and wherein the stirrer comprises an outer layer comprising at least about 50% by weight iridium.

In yet another embodiment, an apparatus for stirring molten glass is disclosed comprising a cylinder comprising a bore, a shaft coaxial with the cylinder disposed in the bore, an impeller projecting radially from the shaft into close proximity of a wall of the cylinder and wherein surfaces of the apparatus comprise a plurality of grooves.

In another embodiment, an apparatus for stirring molten glass is disclosed comprising a cylinder comprising a bore, a shaft coaxial with the cylinder disposed in the bore, an impeller projecting radially from the shaft into close proximity of a wall of the cylinder and wherein the impeller blade is adapted to reduce a flow of molten glass over a surface thereof.

Modifications to the cylinder may be undertaken, without, or in conjunction with, similar modifications to the stirrer (e.g. shaft and/or impeller blades).

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate an exemplary embodiment of the invention and, together with the description, serve to explain the principles and operations of the invention.

DETAILED DESCRIPTION

In the following detailed description, for purposes of explanation and not limitation, example embodiments disclosing specific details are set forth to provide a thorough understanding of the present invention. However, it will be apparent to one having ordinary skill in the art, having had the benefit of the present disclosure, that the present invention may be practiced in other embodiments that depart from the specific details disclosed herein. Moreover, descriptions of well-known devices, methods and materials may be omitted so as not to obscure the description of the present invention. Finally, wherever applicable, like reference numerals refer to like elements.

Figures 1, 1A:
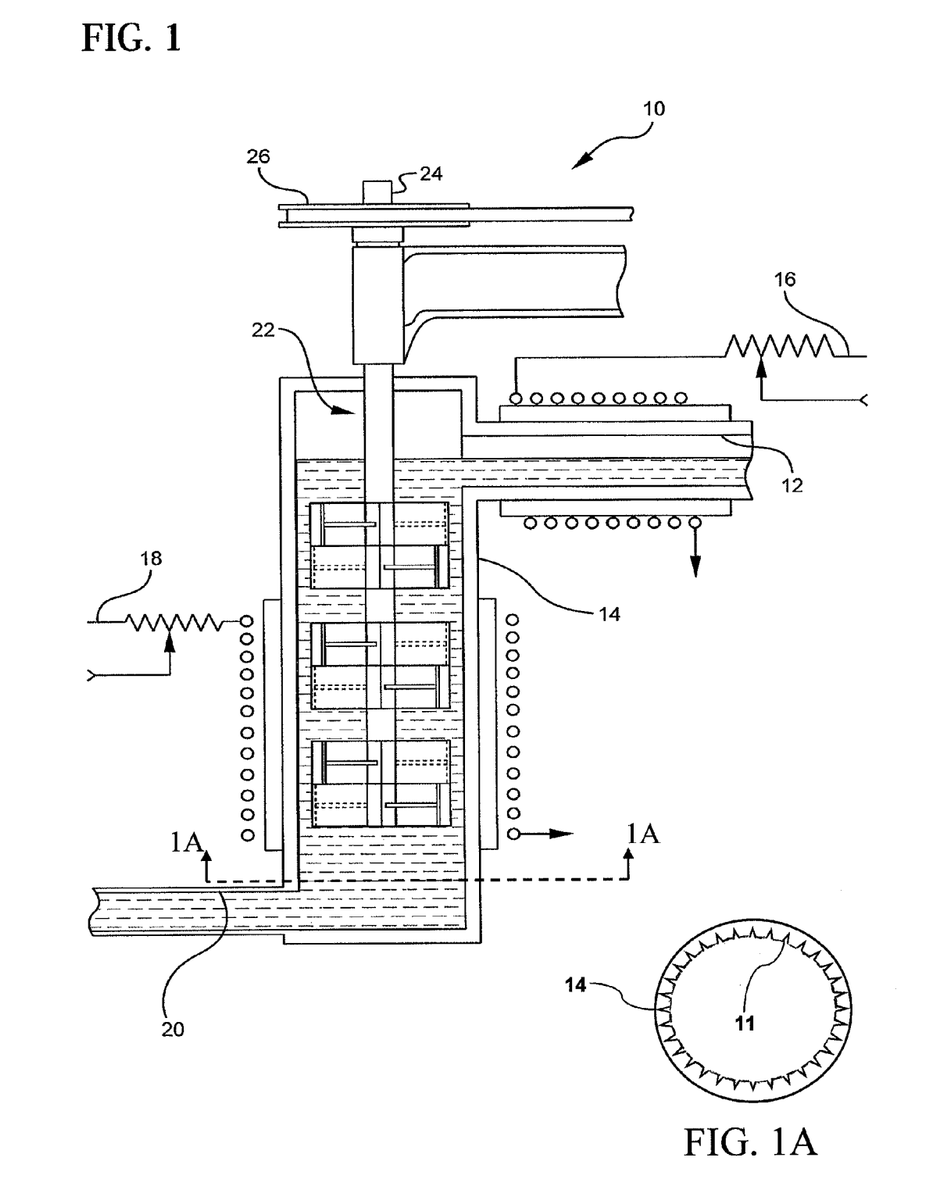
FIG. 1 is a cross sectional view of a stirring chamber showing a stirrer disposed therein and FIG. 1A is a cross sectional view of a portion of the stirring chamber of FIG. 1 showing grooves in the inside surface of the cylinder.

Illustrated in FIG. 1 is a stirring apparatus 10 according to an exemplary embodiment of the present invention. Stirring apparatus 10 comprises an inlet tube 12 extending between a supply of molten glass (not shown) and a cylinder 14. Inlet tube 12 and cylinder 14 may be surrounded by electrical heating windings 16 and 18, and insulated to prevent excessive heat loss. The stirred and homogenized molten glass issues from cylinder 14 through outlet tube 20, which, although not shown, may also be surrounded by electrical heating elements.

The diameter of outlet tube 20 may be that size deemed most suitable for flowing the molten glass, depending upon the viscosity of the glass, the particular style of stirrer 22 arranged within cylinder 14, the rotational speed of the stirrer, and the diameter of the stirrer relative to the inside wall diameter of the cylinder bore.

Stirrer 22, rotatably disposed within the bore of cylinder 14, may take any number of forms. It has been found that the most efficient stirrer may not be the best stirrer for all operating conditions. Complete homogenization of the molten glass can be obtained only if the entire body of glass is forced to pass through a zone of turbulence where the different portions of the glass are progressively sheared with respect to one another, and cords and inhomogeneities are attenuated and dispersed through the parent glass. Desired results can best be obtained by passing the glass through a stirring chamber, preferably cylindrical in shape, having a longitudinally extending stirrer disposed therein whose maximum diameter is only slightly less than that of the cylinder bore. Preferably, stirrer 22 is disposed concentrically within cylinder 14. That is, the axis of rotation of stirrer 22 is coincident with the central longitudinal axis of cylinder 14. Even under these circumstances, certain precautions must be taken to prevent cords of the inhomogeneous glass from creeping along the inner wall of the cylinder or along the shaft of the stirrer without becoming mixed with the main body of the glass. These cords are termed wall cords and shaft cords, respectively. As used herein, cord refers to inhomogeneous regions of the glass wherein the refractive index of the glass locally varies. One cause of cord is incomplete mixing of the glass.

Different devices may be employed to eliminate shaft cords and wall cords. For example, shaft cords may be eliminated by designing the stirrer so that it embodies a mechanical obstacle to such cords which will force glass tending to flow along the shaft out into a zone of turbulence where it is subject to the shearing and mixing action of the stirrer blades.

Wall cords, on the other hand, may be reduced by the closeness of the coupling between the outer edge of the stirrer and the inner wall of the cylinder (stirring chamber). Wall cords may be completely eliminated by establishing a dynamic dam of glass which is forced outwardly by the stirrer impeller against the cylinder wall at a rate sufficiently great that the glass divides and at least some of the glass forms a counterflow along the chamber wall in opposition to the normal direction of flow of glass through the apparatus.

The effectiveness of apparatus 10 is also influenced by the speed of rotation of stirrer 22. Thus, the glass capacity of the equipment (as measured by the rate of through flow of the molten glass) is determined not only by its dimensions, but also by the speed of rotation of the stirrer deposited therein. If the rate of flow of the molten glass through the apparatus is kept low, such as when the apparatus outlet is constricted, or the glass viscosity is high, a speed of rotation of a relatively few revolutions per minute will suffice to appropriately mix the glass and dynamically disrupt the continuity of a downward flow of glass along the cylinder wall. On the other hand, as the outlet is enlarged and the flow rate increased, the speed of the stirring action must also be increased to maintain the dynamic condition for production of the desired glass quality.

Figure 2:
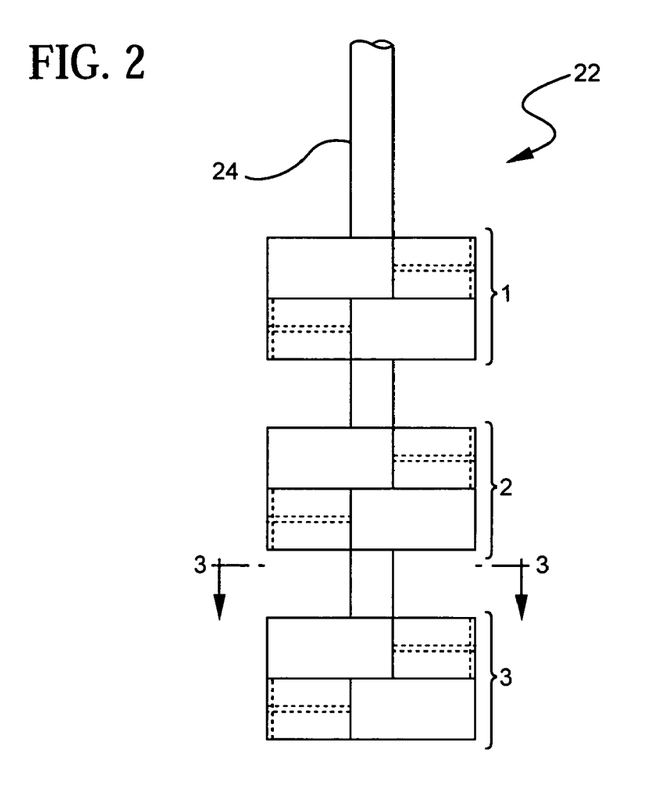
FIG. 2 is a side view of the stirrer of FIG. 1.
Figure 3:
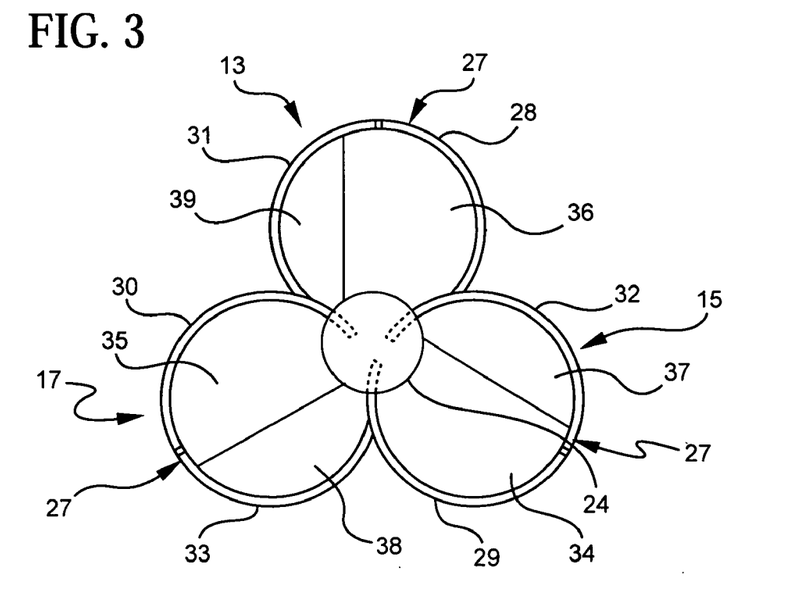
FIG. 3 is a partial top down view of a group of impeller blades disposed on the stirrer of FIG. 2.
Figure 4:
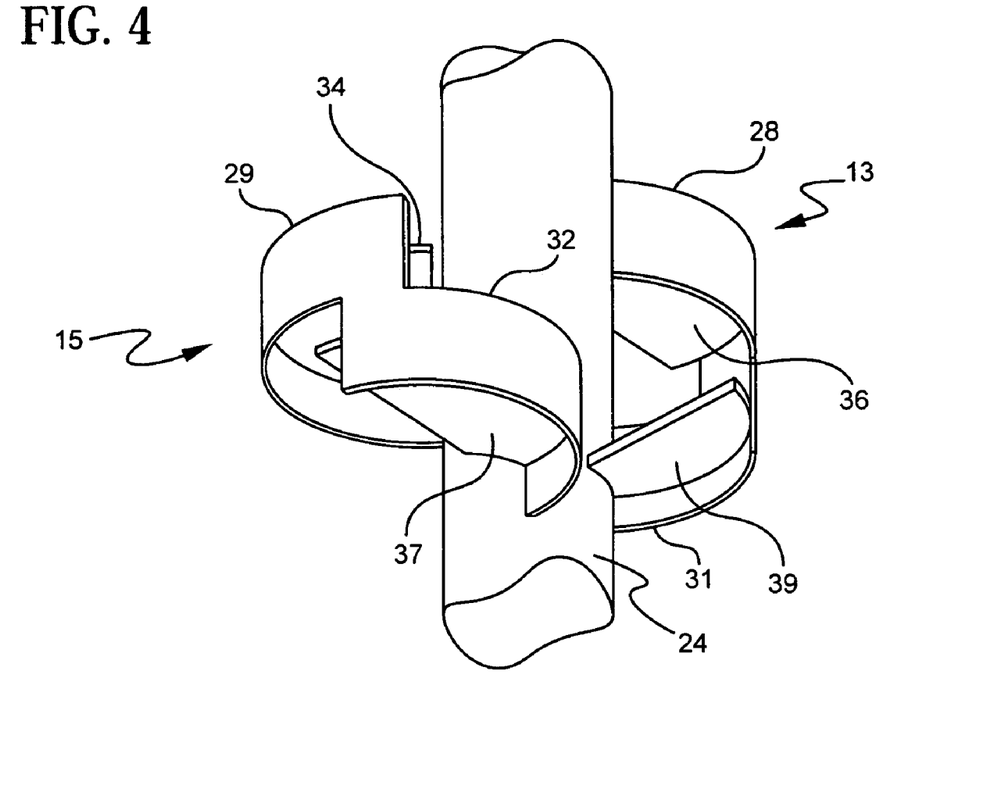
FIG. 4 is a partial perspective view of a group of impellers of FIG. 3.

As illustrated in FIGS. 1 and 2, exemplary stirrer 22 comprises a shaft 24 driven by pulley 26, and further comprising groups 1, 2 and 3, respectively, of arcuate shaped impellers arranged along the length of the shaft. Turning to FIG. 3, each group of impellers 1, 2, 3 comprises a set of three impeller blades, such as impeller blades 28-30, arranged adjacent a similar set of three impeller blades 31-33 curved in the opposite direction. It should be noted that the number of groups of impellers, and the number of impeller blades per group may vary according to need. For example, stirring apparatus 10 may have more or less than three groups of impellers.

Each of the impeller blades 28-33 has its major surface area parallel to the axis of rotation of shaft 24, and each major surface area is arcuate and in some embodiments is comprised of at least a portion of a cylinder. Each impeller blade 28-33 also has one end (the proximate end) suitably anchored to shaft 24 and each impeller blade is anchored to an oppositely curved impeller blade to provide rigidity to the impeller. To avoid confusion, as described hereinafter each assembly comprising one impeller blade anchored to another impeller blade constitutes an impeller. Thus each impeller comprises two impeller blades joined to form an arcuate shape that is substantially circular in aspect. In accordance with the present exemplary embodiment depicted in FIG. 2-3, each impeller set or group 1, 2, 3 includes three impellers 13, 15 and 17. As will be evident to those skilled in the art, other stirrer designs as are known in the art may be used in conjunction with the teaching of this disclosure. Alternative stirrer designs include, but are not limited to designs employing a helical screw and stirrers employing paddles at a given angle relative to the direction of rotation of the stirrer.

To add further rigidity to each impeller and further promote their stirring action, rigidly secured web members in the form of disk segments 34-39 may be provided. Disk segments 34-39 are arranged normal to the axis of shaft 24, follow the inner curvature of the impeller blades and overlap one another when viewed in a vertical manner, thus obstructing direct downward flow of glass within the cylinder volume occupied by the stirrer. As will be appreciated, during rotation of stirrer 22 the impeller blades of some impeller sets throw the glass outward while the impeller blades of the remaining sets pull the glass inward, thereby thoroughly mixing the glass. In short, the movement imparted to the glass by the stirrer is such that not only is the glass thoroughly mixed but, in addition, the flow of glass down the cylinder side wall is effectively prevented by a dynamic dam to such flow created by pressures built up along the wall area.

While this type of stirrer is most efficient if each group of impellers on the stirrer shaft is made up of two or more impellers each having two or more oppositely curved blades, one or more sets of impellers with the impeller blades all curved in the same direction will stir glass satisfactorily when a relatively limited output of glass meets production requirements. Indeed, as stated, the benefits of the present invention may be derived from a variety of different stirrer designs, and the application thereof should not be construed to be limited to any one particular design.

Experimentation and post-mortem examination of failed stirrers has shown that the outside surface of the stirrer impeller/impeller blades is subjected to high stress. This stress results, in part, from the viscosity of the molten glass flowing through the stirring apparatus, and the close tolerance between the stirrer blades and the stir chamber wall. It has been found that the outer-most portions of the impellers may be subject to some of the highest stresses during the stirring process, although forward facing surfaces of the stirrer (relative to the direction of rotation of the stirrer) and the wall portions adjacent to the impellers may also be subject to high stress. That is, the portion of each impeller which is farthest from shaft 12 and closest to the inside wall of cylinder 14, and those portions of cylinder 14 directly opposite the sweep of stirrer 22, generally experience higher stress than other portions of apparatus 10.

Molten glass to which portions of apparatus 10 are exposed may exceed 1000° C. It can therefore be appreciated that materials comprising apparatus 10 must be capable of withstanding such high temperatures. Moreover, in addition to being resistant to the temperatures of molten glass, apparatus 10 must exhibit both corrosion and erosion resistance under the aforementioned stresses. For this reason, various components of apparatus 10, particularly those in contact with the molten glass, comprise refractory metals known to provide a degree of protection from harsh environments.

In spite of the use of suitable refractory metal materials in the construction of apparatus 10, it has been found that the high stress to which apparatus 10 may be subjected can be responsible for the release of refractory metal particles into the molten glass. It is believed this particle release occurs due to erosion of the refractory metal. These refractory metal particles may eventually make their way into the finished glass product as defects. Depending upon the application for the glass, such defects may make the glass unusable. For example, optical applications, such as LCD display devices, are highly intolerant of defects.

In some embodiments according to the present invention, stirrer 22 may comprise a core portion which has been formed from a suitable refractory material, and thereafter coated or clad with a refractory metal. For example, in some applications, the core of stirrer 22 may be formed from molybdenum, and thereafter coated with a refractory metal comprising platinum. The molybdenum core provides shape and mechanical strength to the stirrer, whereas the molybdenum outer layer provides wear and corrosion resistance. In other embodiments, the core of the stirrer may be formed entirely of platinum, or a platinum alloy, such as a platinum-rhodium alloy. Platinum in particular is a desirable refractory metal for glass stirring applications because of its high melting point, corrosion resistance and workability. Nevertheless, platinum, or even platinum rhodium alloys, are not immune to erosion during high temperature stirring processes. By incorporating a more wear resistant material such as iridium, particulate originating from the stirring operation can be significantly reduced.

Figure 5:
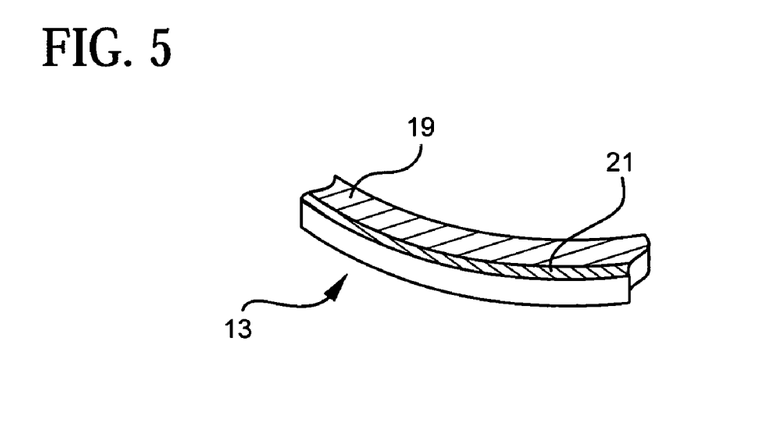
FIG. 5 is a partial perspective view, in cross section, of a portion of an impeller showing an iridium or iridium alloy layer on an outside surface thereof.

Several approaches to the application of iridium in stirring apparatus 10 may be employed. In one such approach, depicted in FIG. 5, iridium, or an iridium alloy (e.g. an iridium-rhodium alloy) may be formed onto core portion 19 as layer 21. In this respect, the core is defined as that base material over which a layer of different material is placed. FIG. 5 illustrates a partial perspective view of a portion of an impeller (e.g. impeller 13), in cross section, and shows core portion 19 and an outer layer 21. For example, a conventional stirrer, such as a platinum or platinum rhodium alloy stirrer, may serve as a core and be layered with one or more iridium or iridium alloy layers 21. Such layers may be applied by conventional methods, such as flame or plasma spraying, or by sputtering for example. Moreover, because the high wear region of stirrer 22 is proximate the ends of the impellers, only a portion of the stirrer need comprise an iridium-containing layer, such as the distal end portions 27 of the impellers (that portion of the impellers closest to the stir chamber walls, or farthest from shaft 24). Layer 21 ideally comprises at least about 50% by weight iridium, but may comprise up to and including essentially 100% iridium, with the understanding that the iridium may have some finite but small amount of impurities that do not detract from the purpose and function of the iridium layer.

Similarly, although not shown, the inside surfaces of cylinder 14 may include a layer in contact with the molten glass comprising at least about 50% by weight iridium.

To provide a thicker layer than is ordinarily achievable, such as with sputtering, the platinum or platinum alloy core 19 of stirring apparatus 10 may be covered with iridium or an iridium alloy layer 21 by cladding. Application of the cladding may be performed, for example, by hot pressing as is known in the art. The portions of stirring apparatus 10 which may be clad include the inside surface of cylinder 14, and the impellers of stirrer 22, and in particular the impeller blades. However, it should be understood that substantially all of stirrer 22 may include a layer 21. The cladding layer is preferably thick enough that the stirrer does not experience a substantial reduction in service life over conventional stirrer designs. The iridium or iridium alloy layer may be at least about 100 μm thick, but preferably at least about 0.5 mm thick, and may be as thick as about 2 mm.

Although FIG. 5 illustrates layer 21 as being on one side of core 19, layer 21 may be formed on one or both sides, and may, in some embodiments, fully encase core 19. Core 19 may be any suitable material which provides form and strength to stirrer 22. Core 19 may, for example, comprise molybdenum or a molybdenum alloy, a ceramic, platinum or a platinum alloy.

Figure 6A:
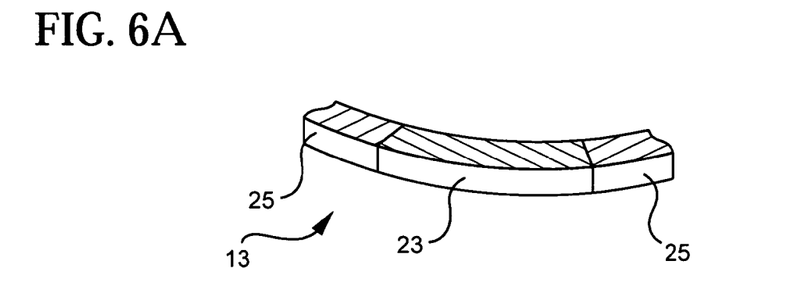
FIG. 6A is a partial perspective view, in cross section, of a portion of an impeller showing an iridium or iridium segment inserted into the impeller and joined to non-iridium-containing portions thereof.
Figure 6B:
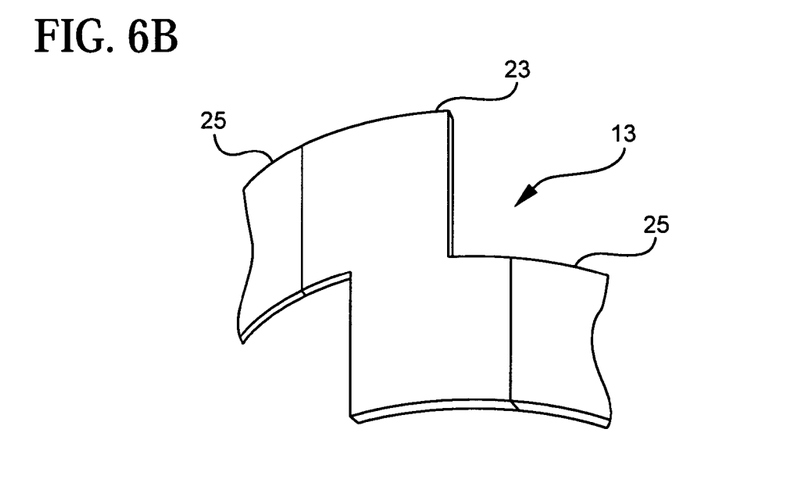
FIG. 6B is another view of a portion of the impeller of FIG. 6a showing an inserted iridium or iridium alloy segment.

In still another embodiment, shown in FIG. 6a, portions of cylinder 14 and stirrer 22, and in particular portions of the impellers, may be fabricated in whole from iridium or an iridium alloy, and inserted into the apparatus, such as by welding. For example, the impeller distal ends (those portions of the impellers closest to the cylinder wall) may be fabricated from iridium, or an iridium-rhodium alloy, with the remainder of the impeller and/or the stirrer fabricated from a non-iridium containing material, such as platinum and/or a platinum rhodium alloy. Shown in FIG. 6A is a cross sectional slice from an impeller, e.g. impeller 13. Segment 23, comprising iridium is inserted into a portion of the impeller and joined to the platinum or platinum rhodium portions 25 of the impeller, such as by welding. Cylinder 14 may also be comprised in whole or in part from iridium or an iridium alloy. For example, those portions of cylinder 14 swept by the impellers may be selectively fabricated from iridium or an iridium alloy, and joined to an adjacent section of the cylinder which may or may not comprise iridium. Alternatively, the entire inside surface of cylinder 14 may include a layer of iridium or an iridium alloy. FIG. 6B shows a larger impeller portion (e.g. impeller 13), rather than a cross sectional slice thereof, and depicts a central segment 23 of the impeller joined to sections 25. In accordance with the present embodiment, central segment 23 is fabricated from a refractory metal comprising iridium, and the abutting segments 25 are fabricated from another refractory metal, such as platinum or an alloy thereof. Central segment 23 may comprise at least about 50% iridium, but in some embodiments segment 23 may be essentially 100% iridium. Suitable iridium alloys include iridium platinum and iridium rhodium.

Figure 7:
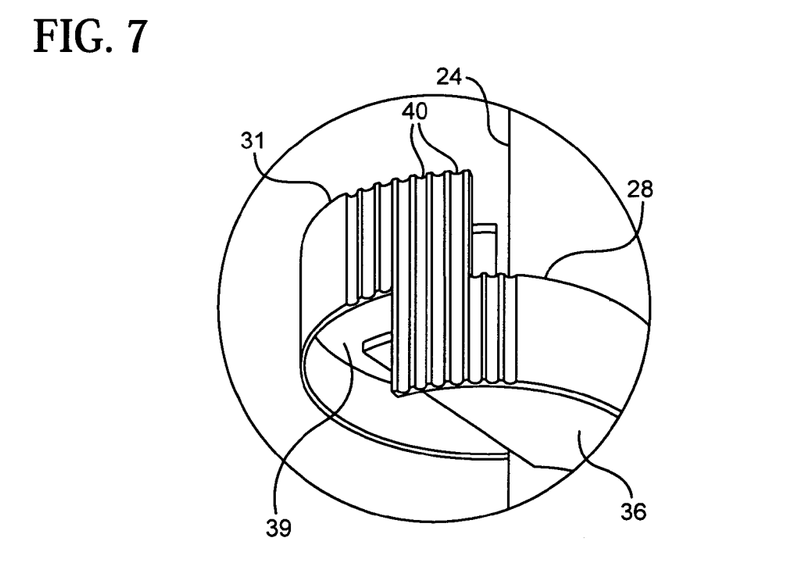
FIG. 7 is a partial perspective view of a portion of an impeller shown in FIG. 4, modified with grooves on a surface thereof.

To further reduce erosion of the stirrer, other modification of stirring apparatus 10 may be made, either alone or in conjunction with the use of an iridium or an iridium alloy layer. For example, the stirrer may be adapted to produce a static, or quasi-static layer of molten glass on surfaces of the stirrer. In particular, the distal end portions 27 of the impellers may comprise grooves in the outside surface thereof. Preferably, grooves 40 are aligned parallel to the long axis of the stirrer shaft and perpendicular to the flow of glass over the surface comprising the grooves, but may vary depending upon the stirrer design. Grooves 40 trap the viscous molten glass, creating a layer of static, or quasi static glass over the end portions of the stirrer impellers. Whereas a smooth surface as used in conventional stirrers leads to flow related erosion of the surface, a static layer of molten glass according to the present embodiment has the effect of forming a protective layer of glass over the surface of the impeller, thereby reducing impeller erosion by reducing the flow of glass over the surface of the impeller.

Figure 8A:
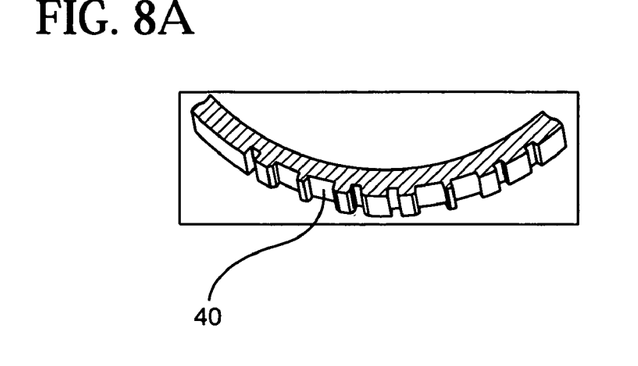
FIG. 8A is a partial cross sectional view of an impeller showing a non-periodic pattern of grooves on a surface of the impeller.
Figure 8B:
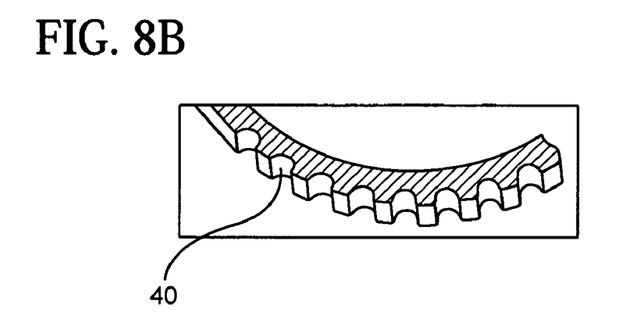
FIG. 8B is a partial cross sectional view of an impeller showing a periodic pattern of grooves on a surface of the impeller.

Grooves 40 may be non-periodic in their arrangement as shown in FIG. 8A, or they may be periodic as illustrated in FIG. 8B. Grooves 40 may be rectangular in shape, with sharp corners defining the groove, or the grooves may be defined by rounded corners and/or arcuate or angled walls. Grooves 40 may vary in size such that the width of the grooves vary. For example, the grooves may have any of the shapes shown in FIG. 8A. Indeed, an impeller may comprise all or a portion of the grooves of FIG. 8A, e.g. non-periodic, varying width and varying groove wall shapes.

Similar to the stirrer, the inside surfaces of cylinder 14 may comprise features which produce a static or quasi-static layer of glass on the cylinder inside surfaces. The features may include dimples and/or grooves 11, as depicted in FIG. 1A. For example, grooves 11 may be cast or machined into the inside surface of cylinder 14. The grooves 11 may be consistent with the grooves described supra for impeller surfaces. That is, the grooves 11 may be aligned parallel with shaft 24, perpendicular with the direction of rotation or sweep of stirrer 22, such that the grooves 11 are substantially perpendicular with a flow of molten glass over the surface of the cylinder, and have similar shapes and spacing. Other orientations for the cylinder grooves 11 are also possible, such as angled or skewed such that the grooves 11 are analogous to rifling in a gun barrel, as is appropriate for the style of stirrer used. If angled, the grooves may have a right hand twist or a left hand twist. The grooves 11 may be periodic, or nonperiodic. In the instance of dimples (not shown), the dimples may be indented (away from the impellers), or protruding (toward the interior of cylinder 14. Dimples may be imparted to portions of stirrer 22 as well, such as the impellers.

Figure 9:
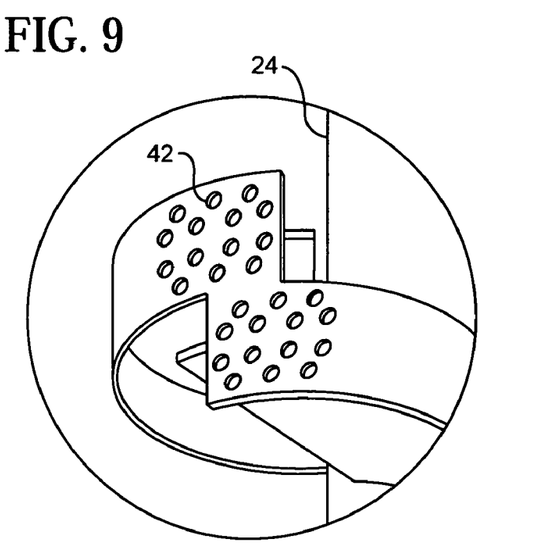
FIG. 9 a partial perspective view of a portion of an impeller shown in FIG. 4, modified with holes on a surface thereof.

In another embodiment, the impellers are machined or otherwise modified such that they define holes extending through the thickness of the impellers, such as depicted in FIG. 9. Through holes 42 are preferably formed at and proximate to the distal end portions 27 of the impellers, but may cover a substantial portion of the total surface of the arcuate impeller blades. Through holes 42 produce a similar effect as grooves 40, establishing a static or quasi static layer of glass at the end of the impellers, thereby reducing erosion of the impellers. Moreover, the elimination of material which would otherwise be available to create particulate also contributes to a reduction in released particulate. The number of holes, the diameters of the holes and the arrangement thereof, should not be such that the stirrer is unacceptably weakened. Preferably the holes have a diameter less than about 1 cm each. Moreover, the grooves or holes need not extend over the entire surface of the impellers, but may be limited to a region which extends less than about 5 cm in either direction from the point farthest from the stirrer shaft.

It should be emphasized that the above-described embodiments of the present invention, particularly any "preferred" embodiments, are merely possible examples of implementations, merely set forth for a clear understanding of the principles of the invention. Many variations and modifications may be made to the above-described embodiments of the invention without departing substantially from the spirit and principles of the invention. For example, the surfaces of the impeller blades may be dimpled, or otherwise modified or modulated, so as to create a static or quasi-staic layer of glass on a surface of the impeller blades, thereby reducing or eliminating wear of the surface in accordance with principles of the present invention. Other stirrer designs (not shown) may include a spiral or screw configuration. All such modifications and variations are intended to be included herein within the scope of this disclosure and the present invention and protected by the following claims.

What is claimed is:

1. An apparatus for stirring molten glass comprising:
   a cylinder comprising a bore;
   a stirrer disposed in the bore, the stirrer comprising:
      a platinum or platinum alloy shaft coaxial with the cylinder;
      a plurality of impellers projecting radially from the shaft into close proximity of a wall of the cylinder, each impeller including an arcuate distal end portion farthest from the shaft; and
   wherein the distal end portion of each impeller consists of iridium or an iridium alloy and the remainder of the impeller consists of platinum or a platinum alloy.

2. The apparatus according to claim 1 wherein the distal end portion of each impeller defines a plurality of holes extending through a thickness thereof.

3. The apparatus according to claim 1 wherein the distal end portion of each impeller comprises a plurality of grooves in a surface thereof, the plurality of grooves aligned parallel to the long axis of the platinum or platinum alloy shaft and perpendicular to a flow direction of the molten glass over the surface of the distal end portion.

4. The apparatus according to claim 1 further comprising a plurality of impeller sets, each impeller set comprising three impellers, and each impeller comprising two impeller blades anchored to each other to form a substantially circular impeller.

5. The apparatus according to claim 1 wherein an inside surface of the cylinder wall comprises a plurality of grooves aligned parallel to the shaft.

6. The apparatus according to claim 5 wherein the cylinder wall comprises iridium.

7. A stirrer for stirring molten glass comprising:
a platinum alloy shaft;
a plurality of impellers extending radially from the shaft, each impeller comprising an arcuate distal end portion farthest from the shaft; and
wherein the distal end portion of each impeller consists of iridium or an iridium alloy and the remainder of each impeller consists of platinum or a platinum alloy.

* * * * *